United States Patent Office 3,268,561

Patented August 23, 1966

3,268,561 GLYCIDYL ETHERS

William J. Peppel and Floyd E. Bentley, Austin, Tex., assignors to Jefferson Chemical Company, Inc., Houston, Tex., a corporation of Delaware No Drawing. Filed Dec. 24, 1963, Ser. No. 333,203
6 Claims. (Cl. 260—348)

This invention relates to glycidyl ethers. More particularly, this invention relates to a new class of high molecular weight monoglycidyl ethers and to their method of preparation.

Glycidyl ethers are useful for a variety of purposes. They are of particular utility as reactive diluents for epoxy resins. However, glycidyl ethers of the type heretofore employed have normally been of comparatively low molecular weight and have normally been prepared by the acid or base-catalyzed reaction of epichlorohydrin with monohydric alcohol (see, for example, U.S. Patent No. 2,061,377).

The preparation of monoglycidyl ethers of polyhydric alcohols using the conventional epichlorohydrin synthesis is complicated by the formation of polysubstituted products. Thus, when polypropylene glycol is first reacted with epichlorohydrin and then dehydrochlorinated to the epoxide, a mixture of the mono- and diglycidyl ethers results. In order to favor formation of the monoglycerol alpha-chlorohydrin-gamma ether, a substantial excess of alcohol over epichlorohydrin must be employed. Subsequent separation of the excess alcohol becomes increasingly difficult as higher alcohols are employed. Some beta-ether is usually obtained, and this is incapable of yielding the desired glycidyl ether on subsequent treatment with alkali. Ordinarily, higher temperatures are required as increasingly higher alcohols are employed.

In accordance with the present invention, a new class of high molecular weight monoglycidyl ethers are prepared which are useful, for example, as reactive diluents for epoxy resins. They can also be polymerized to complex products useful as lubricants or mold-release agents.

In general, the products of the present invention are prepared by reacting a controlled amount of propylene oxide with allyl alcohol to provide a class of allylpolyoxypropylene glycols that can be effectively chlorohydrinated and then dehydrochlorinated under the controlled conditions of the present invention to provide the novel monoglycidyl ethers of the present invention. The reaction sequence that is employed may be schematically illustrated by the following formulae:

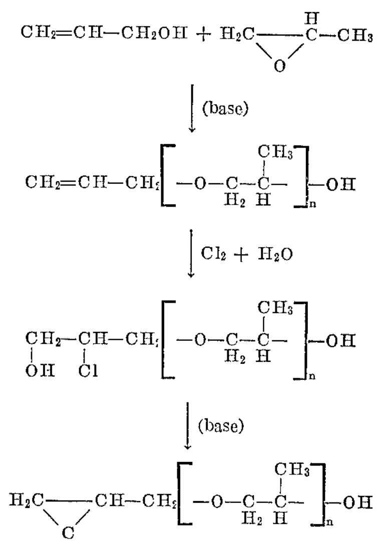

wherein $n$ is an integer having a value of from about 3 to about 12.

It has been discovered in accordance with the present invention that the allylpolyoxypropylene glycol to be used as an intermediate in the preparation of the monoglycidyl ethers should have a molecular weight such that it is sufficiently soluble in water to give at least a 5 wt. percent solution at 5° C., but of a molecular weight high enough so that the derived epoxide, when obtained, is only slightly soluble, at best, in water at a temperature of 40° C. or higher.

It has been further discovered in accordance with the present invention that this can be accomplished when allyl alcohol is reacted with propylene oxide in the presence of a basic catalyst to provide an allylpolyoxypropylene glycol having a molecular weight within the range of from about 200 to about 800. This is provided by condensing each mol of allyl alcohol with from about 3 to about 12 mols of propylene oxide.

The reaction of the propylene oxide with the allyl alcohol is accomplished in accordance with known oxypropoxylation techniques in the presence of an appropriate basic catalyst such as an alkali metal or hydroxide thereof. Thus, sodium potassium, and more preferably, sodium hydroxide or potassium hydroxide may be employed. The proportion of catalyst is ordinarily quite small, constituting from about 0.1 to about 1.0 wt. percent of the total reactants. It is normally within the range of about 0.2 to about 0.4. For convenience, all of the catalysts for the entire reaction are ordinarily dissolved in the allyl alcohol before the addition of propylene oxide. However, more catalyst can be added subsequently in any stage of the condensation if the propylene oxide reaction tends to become sluggish.

The thus-prepared allylpolyoxypropylene glycol is then used as an intermediate in the preparation of the desired monoglycidyl ether.

The monoglycidyl ether is prepared by treating an aqueous solution of the allylpolyoxypropylene glycol with molecular chlorine at a temperature within the range of from about −10° to about 40° C. in accordance with what is otherwise conventional practice to provide the corresponding chlorohydrin derivative. Preferably, the temperature is within the range of 0° to 25° C.

The thus-prepared chlorohydrin derivative is thereafter dehydrochlorinated with a base material at a temperature within the range of from about 0° to not more than about 40° C. (and more preferably, 0° to 25° C.) to provide the monoglycidyl ether.

The basic substances which are effective in the dehydrochlorination are preferably oxides or hydroxides of the alkali metals or alkaline earth metals. Other basic materials such as amines can be used, but are not favored because the rates of reaction are slower. It is desirable to conduct the dehydrochlorination at comparatively rapid rates because of the susceptibility of the glycidyl ethers to alkaline hydrolysis. Normally, therefore, it is desirable to conduct the dehydrochlorination reaction with a contact time of from about 15 minutes to about one hour, which, in practice, can be conveniently accomplished by carrying the dehydrochlorination conversion from about 60% to about 85%, at which point excess base is neutralized with any appropriate acidic material, e.g., a mineral acid or strong organic acid such as oxalic acid. The product, a polypropylene glycol monoglycidyl ether, is thereafter recovered by heating the reaction mixture to a temperature within the range of from more than about 40° to about 100° C., and more preferably, a temperature of about 50° to 80° C. When this is done, phase separation occurs and an aqueous phase and an organic phase are obtained. The organic phase will consist essentially of the desired monoglycidyl ether.

We have discovered that the chlorohydrination synthesis described above is a necessary part of the present invention in that other common epoxidation techniques are normally unsatisfactory. Thus, direct epoxidation of the allylpolyoxypropylene glycol with peracetic acid gave unsatisfactory results.

The invention will be further illustrated by the following specific examples, which are given by way of illustration and not as limitations on the scope of this invention.

*Example I*

Allylpolyoxypropylene glycol was prepared by the potassium hydroxide catalyzed addition of propylene oxide to allyl alcohol. The product had an iodine number of 50, indicating a molecular weight of 508. This corresponds to an 8:1 adduct of propylene oxide to allyl alcohol.

A solution of 100 g. of the above allylpolyoxypropylene glycol in 900 g. water was cooled to 0° to 5° C. by an ice bath. Chlorine gas was passed through the solution at the rate of 1 g./min. until a permanent yellow color was obtained. The weight increase was 15 g. and a chloride analysis of 0.192 mol corresponded to a yield of 97%.

The chlorohydrin solution was treated at 15° C. over a period of one hour with a solution of 15.6 g. of sodium hydroxide dissolved in 16 ml. of water. The solution was then neutralized with phosphoric acid using a pH meter and then warmed to 70° C. The organic layer was removed from the top, treated with 5 ml. of 30% hydrogen peroxide for bleaching purposes and stripped of volatiles under vacuum at 80° C. The product was filtered using a filter aid to give 90 g. clear, colorless, somewhat viscous liquid. The oxirane oxygen content of this material was 2.25% by weight (theoretical 3.05%).

*Example II*

The experiment described in Example I was repeated except that calcium oxide was used as the dehydrochlorinated reagent.

The dehydrochlorination proceeded to 88.5% conversion, and from 100 g. starting allylpolyoxypropylene glycol, there was isolated 75 g. of the glycidyl derivative. Oxirane oxygen content was 2.07% by weight (theoretical 3.01%).

*Example III*

A typical commercial epoxy resin (Epon 826, Shell Chemical Company) was cured at 100° C. for 24 hours with triethylenetetramine alone and with the addition of polypropylene glycol monoglycidyl ether (mol wt. 540, oxirane oxygen content, 2%). Approximately 15% of the glycidyl ether was sufficient to yield a resin with appreciably increased flexibility.

What is claimed is:

1. A process for preparing a polyoxypropylene monoglycidyl ether having a molecular weight within the range of about 200 to about 800 which comprises the steps of reacting allyl alcohol with from about 3 to about 12 mols of propylene oxide per mol of allyl alcohol under basic conditions to provide an allylpolyoxypropylene glycol intermediate product, treating an aqueous solution of said intermediate allylpolyoxypropylene glycol with molecular chlorine at a temperature of from about −10° C. to about 40° C. to provide a corresponding chlorohydrin derivative, dehydrochlorinating said chlorohydrin derivative under basic conditions at a temperature within the range of 0° to not more than about 40° C. to provide a reaction mixture comprising said polyoxypropylene monoglycidyl ether, neutralizing said reaction mixture and warming said reaction mixture to a temperature within the range of more than 40° C. to about 100° C. whereby phase separation occurs and said reaction mixture separates into an aqueous phase and an organic phase consisting essentially of said polyoxypropylene glycol monoglycidyl ether and recovering said polyoxypropylene glycol monoglycidyl ether.

2. A method as in claim 1 wherein said allylpolyoxypropylene glycol intermediate is chlorinated at a temperature within the range of about 0° to about 25° C., wherein said corresponding chlorohydrin derivative is dehydrochlorinated at a temperature within the range of from about 0° to about 25° C. and wherein said reaction mixture is warmed to a temperature within the range of about 50° to about 80° C.

3. A polyoxypropylene monoglycidyl ether having the formula:

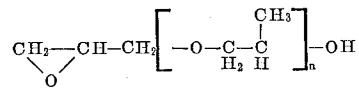

wherein $n$ is an integer having a value of from about 3 to about 12.

4. A compound as in claim 3 wherein $n$ has a value of about 8.

5. A chlorohydrin having the formula:

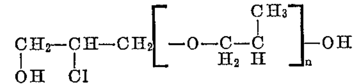

wherein $n$ has a value within the range of about 3 to about 12.

6. A chlorohydrin as in claim 5 wherein $n$ has a value of about 8.

References Cited by the Examiner

UNITED STATES PATENTS

| | | | |
|---|---|---|---|
| 2,327,053 | 8/1943 | Marple et al. | 260—615 |
| 2,380,185 | 7/1945 | Marple et al. | 260—615 |
| 2,448,664 | 9/1948 | Fife et al. | 260—615 |
| 2,496,582 | 2/1950 | Enyeart | 260—615 |
| 2,637,713 | 5/1953 | Suen et al. | 260—348 |
| 2,729,623 | 1/1956 | Gregg | 260—615 |
| 2,965,652 | 12/1960 | Gaertner | 260—348.6 |
| 2,989,547 | 6/1961 | Whyte | 260—348.6 |
| 3,102,893 | 9/1963 | Gaertner | 260—348 |

FOREIGN PATENTS

| | | |
|---|---|---|
| 488,698 | 12/1952 | Canada. |

OTHER REFERENCES

Jahn, H., Plaste und Kautschuk, vol. 6, No. 12 (1959), pages 583–7.

WALTER A. MODANCE, *Primary Examiner.*

NICHOLAS RIZZO, *Examiner.*

NORMA S. MILESTONE, *Assistant Examiner.*